UNITED STATES PATENT OFFICE.

SAMUEL FIELD, OF LONDON, ENGLAND, ASSIGNOR TO THE METALS EXTRACTION CORPORATION, LIMITED, OF LONDON, ENGLAND.

PURIFICATION OF ZINC SOLUTIONS.

1,331,334. Specification of Letters Patent. Patented Feb. 17, 1920.

No Drawing. Application filed May 21, 1919. Serial No. 298,669.

*To all whom it may concern:*

Be it known that I, SAMUEL FIELD, a subject of the King of England, residing at London, England, have invented certain new and useful Improvements in the Purification of Zinc Solutions, of which the following is a specification.

This invention relates to improvements in the purification of zinc solutions from metals other than zinc, and it refers particularly to the purification of zinc sulfate solutions obtained by the treatment of zinc ores or zinc-containing materials with sulfuric acid, from which solutions the zinc is subsequently deposited electrolytically.

As is well-known, to obtain a successful deposition of zinc by electrolysis the zinc sulfate liquors must be of a high order of purity; impurities such as copper, cadmium, iron, antimony, arsenic, nickel and cobalt must be eliminated as they affect adversely and very seriously the deposition both qualitatively and quantitatively.

It has hitherto been common practice to remove these impurities in a series of steps by precipitating each with a suitable precipitant. It is an object of the present invention to provide a process whereby a number of the metals other than zinc may be precipitated in a single operation.

It has been proposed to lixiviate roasted zinc ores in the presence of ozone for the purpose of preventing iron salts from being formed.

According to the present invention a process for the purification of zinc solutions, such for example as zinc sulfate solutions, from other metals consists in treating the solutions with ozone, for example in the form of ozonized air, in the presence of a material which acts as a catalyst (for example a manganese compound), to bring about the combination of the oxygen with and the consequent precipitation of the metals to be removed from the solutions.

Preferably the solutions should be warm when treated with the ozone, and in many cases it may be advantageous to agitate them. The agitation may be effected by mechanical means or by the introduction of the ozone itself.

The ozone is employed in the form of ozonized air which is produced electrically with a low energy consumption in the manner which is well-known.

The manganese compound employed, if it passes into solution in the electrolyte, presents no difficulties in the electro-deposition step, and it may often be unnecessary to add a manganese compound since many ores contain manganese, which is dissolved when the ore is treated with acid for the solution of the zinc.

Materials which have been found suitable for treating the solutions in conjunction with ozone are manganese dioxid, manganese hydrate, lead oxid, lead carbonate, zinc oxid, zinc hydrate and zinc carbonate.

When a manganese compound is employed it may be added either in the form of a manganic or manganous compound, and during the reaction the manganese partly passes into solution, and is recovered at the anodes in the electrolytic cells; when lead anodes are employed the manganese is deposited as dioxid mixed with lead dioxid, and this mixture may be added to impure zinc solutions to be treated with ozone.

As an example of the present invention the impure zinc liquors obtained by treating a zinc ore, which has previously been calcined if necessary, or other zinc-containing material with sulfuric acid, for example, the acid liquors from the electrolytic cells, are filtered to remove any insoluble residue, and are then passed to a vessel, in which they are agitated and heated, say to about 80°–100° C., and they are gently stirred. A quantity of a manganese compound is then added amounting to, for example, one quarter per cent. of the solutions. The solutions are then treated with ozonized air, introduced in any convenient way. The introduction of the ozonized air agitates the solution, and this agitation may be sufficient without the use of any mechanical stirring devices.

The result of this treatment is that any iron present is completely precipitated as ferric hydroxid, cobalt is thrown down as a higher insoluble oxid, and with these metals any arsenic and antimony present are also thrown down.

Copper, nickel and cadmium, however, are not so completely removed, but any traces of these metals remaining may be removed by treatment with zinc fume under the conditions described in the co-pending application of Sulman and Field, Serial No. 296553, filed May 12, 1919, and entitled Improvements in the purification of zinc solutions, or with zinc in the presence of acid as is described in the co-pending application of Sulman and Field, filed May 12, 1919, Serial No. 296552, and entitled Improvements in the purification of zinc solutions.

Should the zinc liquors obtained from the ore or the zinc-containing material contain any manganese, the addition of chalk or other similar precipitant, such as zinc oxid, serves to effect precipitation of sufficient manganese compound to carry on the process according to the present invention without the addition of any further manganese compound.

After separation of the solid matter from the liquid the purified zinc solutions resulting are particularly suitable for the deposition of the zinc therefrom electrolytically.

By the process described above any iron, arsenic, antimony, copper, cobalt, nickel and cadmium present in the impure solutions are precipitated.

By employing the process described above as a step in the electrolytic extraction of zinc from its ores, much smaller volumes of liquors require to be handled by reason of the greater purity of the liquors and the consequent greater degree of extraction of zinc by electrolysis, and in fewer stages than has heretofore been possible.

What I claim as my invention and desire to secure by Letters Patent is:—

1. A process for the purification of zinc solutions from foreign metals, which comprises treating the solution with ozone in presence of a catalyst.

2. A process for the purification of zinc solutions from foreign metals, which comprises treating the solution with ozonized air in presence of a catalyst.

3. A process for the purification of zinc solutions from foreign metals, which comprises treating the solution with ozonized air in presence of a substance which can act as a base.

4. A process for the purification of zinc solutions from foreign metals, which comprises treating the solution with ozonized air with application of heat in presence of a substance which can act as a base.

5. A process for the purification of a zinc sulfate solution from foreign metals, which comprises treating the solution with ozonized air in presence of a manganese compound.

6. A process for the purification of a zinc sulfate solution from foreign metals, which comprises treating the solution with ozonized air in presence of a mixture of manganese dioxid and lead dioxid produced in the electrolysis with lead anodes of a zinc solution containing manganese.

7. A process for the purification of a zinc sulfate solution from foreign metals, which comprises treating the solution while agitated and at a temperature of 80°–100° C. with ozonized air in presence of a mixture of manganese dioxid and lead dioxid produced in the electrolysis with lead anodes of a zinc solution containing manganese.

In testimony whereof I affix my signature.

SAMUEL FIELD.